June 22, 1937.  R. PATERAS PESCARA  2,084,823
MOTOR COMPRESSOR
Filed Sept. 7, 1935   6 Sheets-Sheet 1
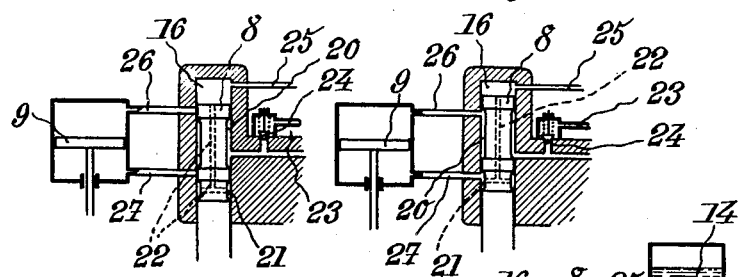
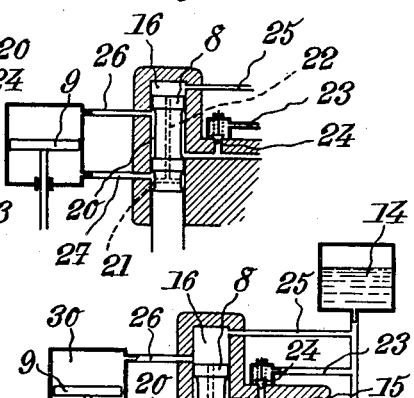
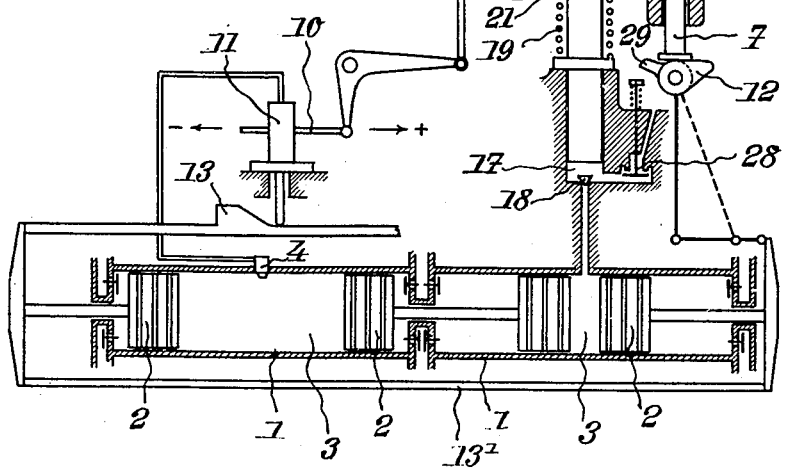
INVENTOR
RAUL PETERAS PESCARA
ATTORNEYS June 22, 1937.  R. PATERAS PESCARA  2,084,823
MOTOR COMPRESSOR
Filed Sept. 7, 1935    6 Sheets-Sheet 2
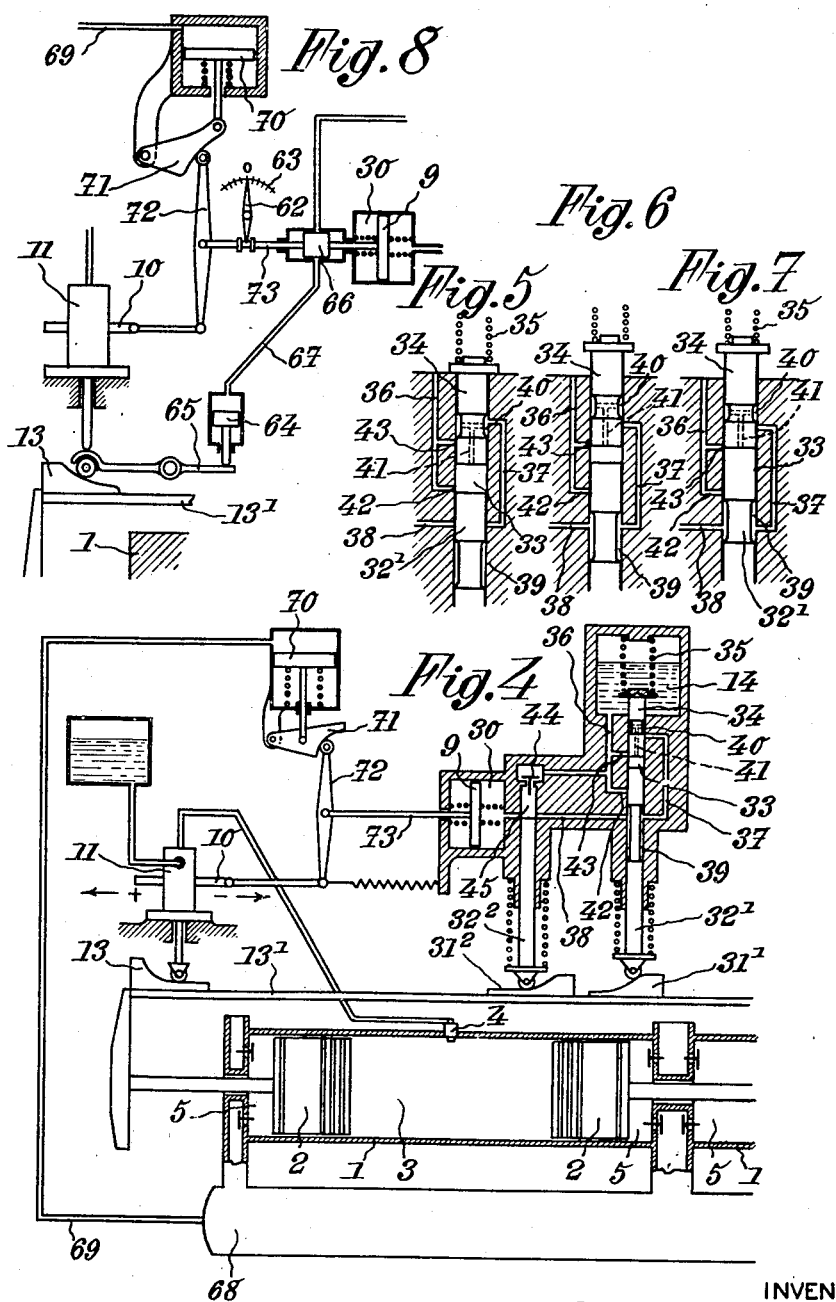
INVENTOR
RAUL PETERAS PESCARA
ATTORNEYS

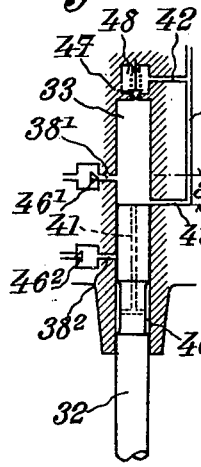
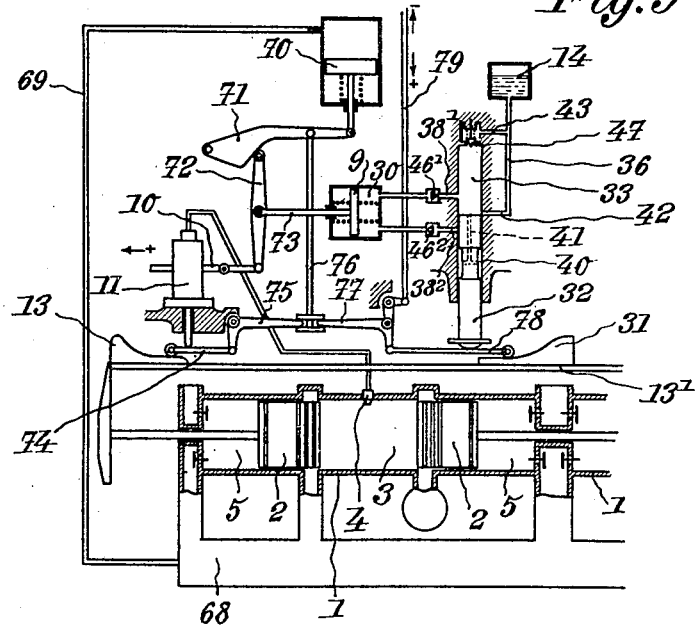

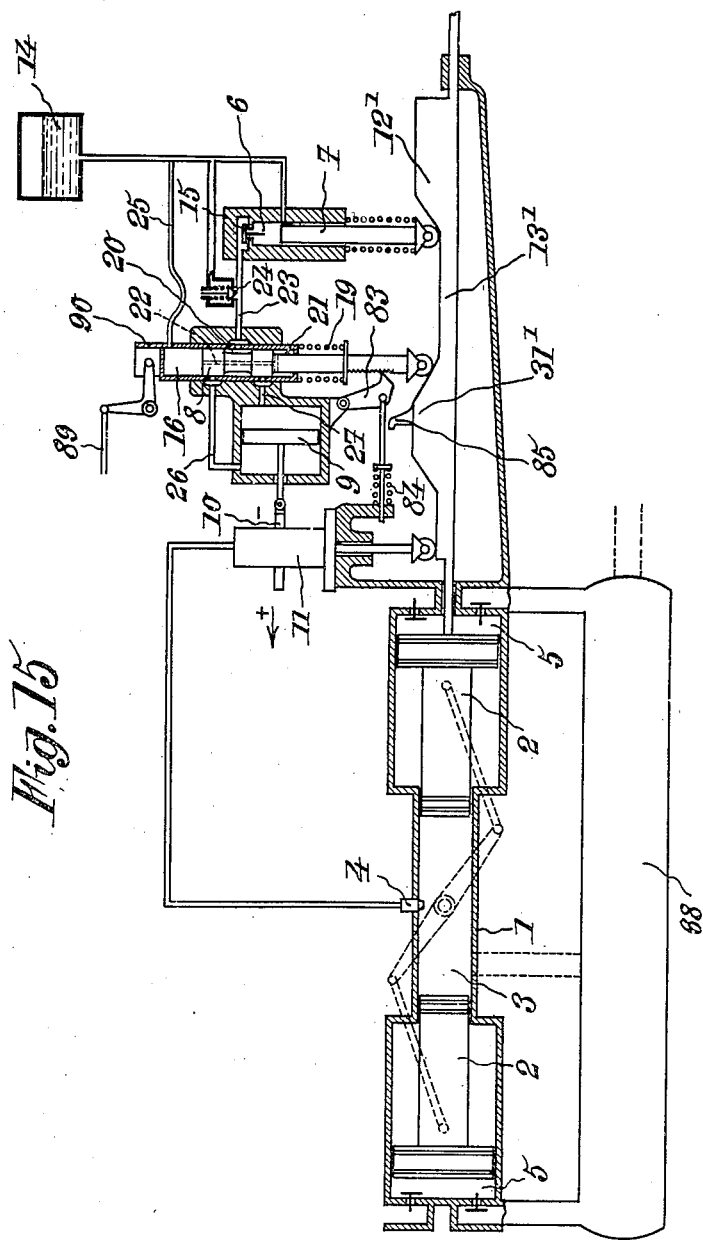

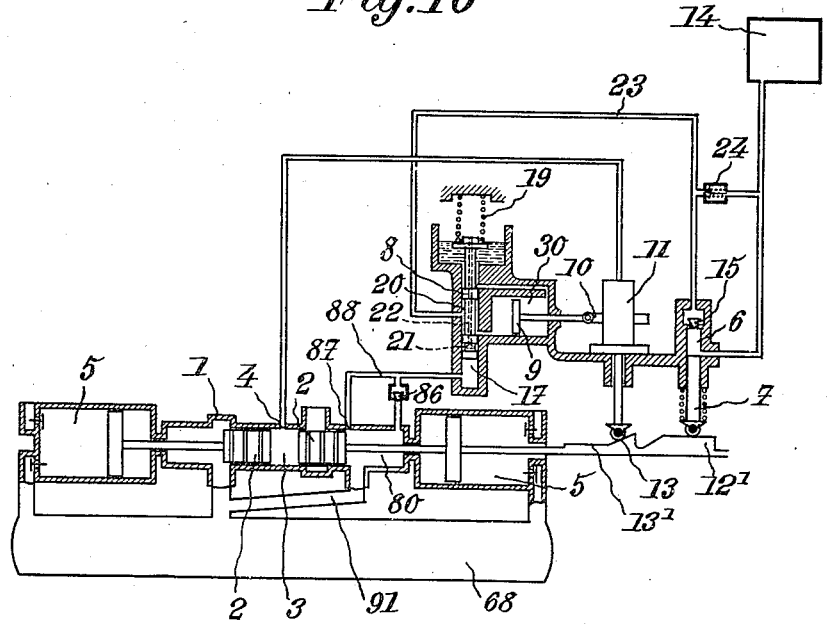
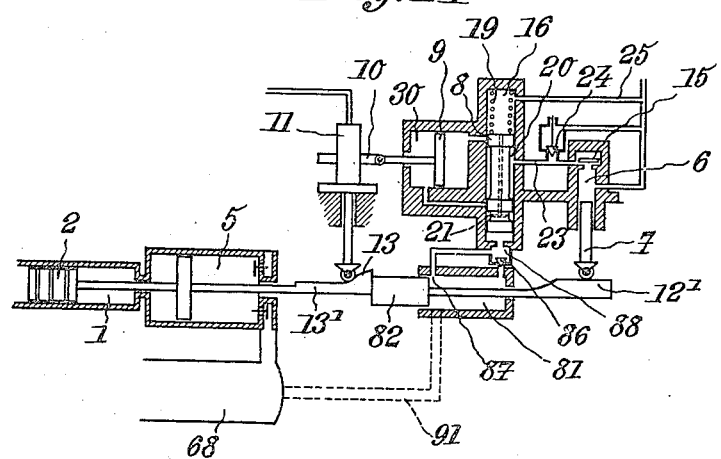

Patented June 22, 1937

2,084,823

UNITED STATES PATENT OFFICE 2,084,823

MOTOR COMPRESSOR

Raul Pateras Pescara, Paris, France

Application September 7, 1935, Serial No. 39,643
In Belgium September 7, 1934

19 Claims. (Cl. 230—56)

The present invention relates to motor-compressors having free pistons, this term designating machines which transform directly the combustion energy of a liquid, gaseous, or even powdery fuel, into energy stored up in the form of the pressure of a compressed fluid, such as air, without the medium of a mechanical energy, this term including machines working according to a uniform or variable feed pressure cycle.

The object of the present invention is to provide machines of this kind the running of which can be adjusted and regulated and in which the stroke of the movable parts and the pressure in the motor chambers can be limited and controlled, more especially in the case of machines including several elements coupled together, for instance in tandem fashion.

The essential feature of the present invention consists in providing means for automatically correcting, for certain conditions of working of machines of this type, the variations of stroke of the movable parts by varying the fuel feed, said means being directly operative by a variable effect, such as the stroke or the acceleration of one of the movable parts, or even indirectly controlled by the pressure of a gas the value of which depends upon the stroke of said movable parts.

According to another feature of the present invention, I combine with the regulating means above referred to, regulating means for varying the power of the machine and also the time of injection or ignition by varying the rate of feed of fuel or the feed pressure or both.

Still another feature of the present invention consists in providing means for automatically adapting the correction devices above referred to to the various conditions of working of the machine.

Other features of the present invention will result from the following detailed description of some specific embodiments thereof.

Preferred embodiments of the present invention will be hereinafter described with reference to the accompanying drawings, given merely by way of example, and in which:

Fig. 1 is a diagrammatic vertical sectional view of a motor generator having free pistons coupled in tandem-like fashion provided with a device for regulating the stroke of the movable parts of the machine;

Figs. 2 and 3 show, in a similar manner, the distributing elements of the machine shown in Fig. 1 in two positions different from that shown in Fig. 1;

Fig. 4 shows, in a similar manner, a portion of a machine similar to that of Fig. 1, further including a correcting device combined with the normal regulating device;

Figs. 5, 6 and 7 show, in a similar manner, the distributing elements of the machine shown by Fig. 4, in three respective positions different from that illustrated by Fig. 4;

Figure 14:
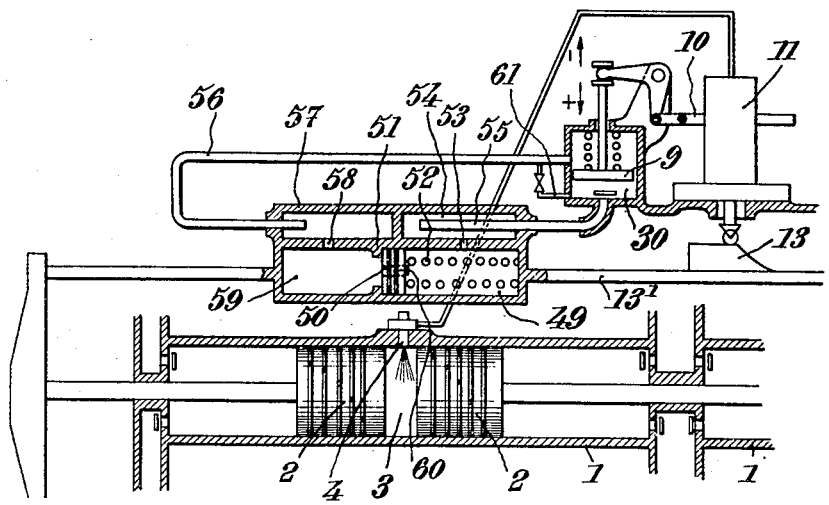

Fig. 8 diagrammatically shows a modification of the arrangement of the regulating elements of the machine shown in Fig. 4, this modification including a system for stopping the machine;

Fig. 9 diagrammatically shows, in vertical section, a portion of a motor generator with free pistons including a different correcting device combined with the means for regulating the power and varying the time of injection of the motor part of the machine, the correcting means being automatically adapted to the various conditions of working of the machine through the action of the regulating device of the receiving portion of the machine;

Figs. 10, 11, 12 and 13 show, in a similar manner, the distributing elements of the machine according to Fig. 9, in four respective positions different from that illustrated by Fig. 9;

Fig. 14 diagrammatically shows, in vertical section, a portion of a motor generator having free pistons coupled in tandem-like fashion, provided with a correcting device operative by variations of the acceleration of the movable parts of the machine;

Fig. 15 diagrammatically shows, in vertical section, a simple motor generator with free pistons provided with a correcting device operative by variations of the stroke of the movable parts of the machine;

Fig. 16 shows, in a similar manner, a modification of such a device in the case of a motor compressor in which the pressure in the compensating cushions is variable;

Fig. 17 shows, in a similar manner, another modification of such a device, in the case of a simple motor-compressor which is not provided with a compensating cushion.

It will be assumed, in the following description, that the motor compressor with free pistons works on a two stroke cycle.

The compressor itself may be of any conventional or other type. For instance, each motor unit includes a cylinder 1 in which move, in opposite directions, two motor pistons 2, limiting between them a motor chamber 3 and each driving one or several compressor pistons, which, as a matter of fact may be part of the motor pistons 2, as shown in Figs. 1, 4, 9 and 14. The motor chamber is provided, in its middle part, with an injection device 4 (or an ignition device) and both the motor chambers and the compressor chambers are fitted with suitable distributing elements.

The machine may include, as shown in Figs. 1 to 14, at least two units coupled in tandem-like fashion and in which the respective motor strokes take place in succession, or, as shown in Figs. 15 to 17, a single unit or motor chamber.

In the case of units coupled in tandem-like fashion, it is known that a small variation of the stroke of the movable parts, that is to say of the motor pistons and organs associated therewith, produces an important variation of the pressure of the motive fluid, which might be detrimental to the good working and resistance of the machine.

According to the present invention, the variations in the stroke of the movable parts of these machines are limited by proportioning the amount of fuel injected at 4 to the value of said strokes. In order to obtain this result, the device for adjusting the feed of the injection pump is controlled through a relay, for instance a hydraulic one, made and operated in such manner that, if the pressure in one of the motor cylinders exceeds the normal value, the amount of fuel injected into the other motor cylinder, for the following stroke, is reduced by the amount necessary for restoring the normal pressure in the first mentioned cylinder. Inversely, if the pressure in one of the motor cylinders drops below the normal value, the amount of fuel injected into the other cylinder is increased by the amount necessary for restoring the normal pressure in the first cylinder.

This relay itself may be operative by the maximum pressure existing in the motor cylinders at the end of the compression stroke (Fig. 1), or by cams or the like operatively connected with one of the movable parts (motor pistons) of the machine (Figs. 4 and 9) or again by a free piston coacting with a cylinder driven by the movable parts of the machine.

In the embodiment of Fig. 1, the relay consists of an oil pump including a cylinder 6, a piston 7 and a distributing member or slide valve 8. This pump is adapted to feed an accurately measured amount of oil intended to act on one or the other of the faces of a control piston 9 acting on the quantitative adjustment rod 10 of the injection pump 11 from which injector 4 is fed. This control adjustment may, for example, be of the type shown in Patent No. 1,845,600. This pump 11 is, for instance actuated through a cam 13 integral with the movable part 13¹ rigid with the end motor pistons 2.

As shown in Fig. 1, the piston 7 of the oil pump is controlled by an oscillating cam 12, driven by movable part 13¹. This oil pump draws oil from a reservoir 14 and discharges it, through a check valve 15, into a cylinder 16 in which slide valve 8 is movable. Valve 8 is subjected, on the one hand, to the action of the pressure existing in a chamber 17, which communicates, through a valve 18, with one of the motor chambers 3, and, on the other hand, to the action of a return spring 19.

Slide valve 8 is provided with two grooves 20 and 21. The lower groove 21 communicates, through a conduit 22 provided throughout valve 8, with cylinder 16. Before cylinder 16, there is provided a conduit 23, with a check valve 24, for the return of oil to reservoir 14. The top of cylinder 16 is also placed in communication, through conduit 25, with said reservoir 14, for the return of oil thereto. Cylinder 16 is also provided with two conduits 26 and 27 through which oil can be fed to chamber 30, which contains piston 9, for acting on one face or the other of said piston.

The position of slide valve 8 depends upon the maximum pressure existing in motor chamber 3. In Fig. 1 I have shown the position of the slide valve when said pressure is not sufficient, which therefore would correspond to too short a stroke of the driving pistons 2. In this case, slide valve 8 permits oil discharged by pump 6—7 to pass through groove 20 and conduit 27, which produces an upward displacement of piston 9 and drives the adjustment rod 10 of the injection pump 11 in the direction of the arrow marked with positive sign +, this corresponding to an increase of the feed of fuel for the next injection. The oil discharged by piston 9 returns to reservoir 14 through conduits 26 and 25.

In Fig. 2 I have the position of slide valve 8 for a normal stroke of the pistons. In this case, slide valve 8 stops both of conduits 26 and 27 and the whole of the oil drawn by the pump 6—7 is returned to the reservoir through valve 24 and conduit 23.

In Fig. 3 I have shown the position of slide valve 8 when the pressure in motor chamber 3 is too high (the stroke of the pistons being too long). In this case, valve 8 permits the flow of oil, discharged by pump 6—7, through groove 20 and conduit 26, which produces a downward displacement of piston 9 and drives the adjustment rod 10 of the feed pump 11 in the direction of the arrow marked by the negative sign —, thus reducing the feed for the next injection. The oil discharged by piston 9 is returned to reservoir 14 through passages 27, 21, 22 and 25.

The pressure in chamber 17, which corresponds to the maximum pressure existing in the motor chamber 3 at the end of the stroke of the driving pistons must be eliminated after each motive impulse, and this result may be obtained, for instance, by providing in this chamber 17 a valve 28 which is opened at the proper time by a finger 29 operatively connected with cam 12.

The amount of oil that produces the displacement of piston 9 and therefore ensures the quantitative adjustment of the fuel feed may be measured, in a more precise manner, by means of the device shown in Figs. 4 to 7 or of the device of Figs. 9 to 13.

In these embodiments of the invention, pump 6—7 is done away with and the measuring of the oil introduced into chamber 30, which is limited by piston 9, is made by the distributing element (slide valve) itself, this measuring being performed, for instance, in accordance with the length of the stroke of the driving pistons 2.

In the embodiment of Figs. 4 to 7, the movable member 13¹ rigid with the end driving pistons is provided with two cams 31¹ and 31², of suitable outline, acting on two slide valves 32¹ and 32². Slide valve 32¹ ensures, for instance the correction corresponding to too short strokes and slide valve 32² that corresponding to too long strokes.

Valve 32¹ moves in a cylinder 33 and can, from a certain position, drive a piston 34 urged by a return spring 35.

Into cylinder 33 open two conduits 42 and 43 located at different levels and both connected with a conduit 36. There also opens into cylinder 33 a conduit 37 forming a shunt between two points of said cylinder, one of these points being located at the same level as the end of a conduit 38 opening into the chamber 30 of the adjustment piston 9. In piston $32^1$ there is provided a circular groove 39 and in piston 34 there is provided a circular groove 40 communicating, through an axial conduit 41 extending through piston 34, with cylinder 33.

In Fig. 5 I have shown the relative positions of the different parts above described when slide valve $32^1$, in the course of its upward displacement produced by the action of cam $31^1$, is about to shut the opening 42 of conduit 36 through which reservoir 14 communicates with the inside of cylinder 33, that is to say with the space existing at this time between slide valve $32^1$ and piston 34, which is applied against its seat by spring 35. As soon as slide valve $32^1$ has closed this opening 42, this communication is cut off and the amount of oil enclosed in this space (between pistons $32^1$ and 34) produces the upward displacement of piston 34 until the opening 43 is uncovered (Figs. 4, 6 and 7), in which position said piston 34 stops.

During this upward displacement of slide valve $32^1$ and piston 34, one of the openings of conduit 37 is always stopped, either by slide valve $32^1$ at the beginning of the displacement (Fig. 5), or by piston 34 at the end of the displacement (Figs. 4 and 6).

The amount of oil between slide valve $32^1$ and piston 34 decreases after the stopping of said piston 34, due to the opening of opening 43, as the slide valve $32^1$ is moving upwardly and it becomes zero (Fig. 7) (corresponding to the maximum upward stroke of the piston) when the stroke of the movable part $13^1$ (and of cam $31^1$) is normal.

Supposing that, in fact, this stroke is normal. Piston 34 follows, for some time, slide valve $32^1$ in its upward movement, until piston 34 occupies the position shown in Fig. 5, after which valve $32^1$ moves further down, uncovering opening 42. A new amount of oil, coming from reservoir 14, then fills the space inside cylinder 33 between slide valve $32^1$ and piston 34. This new amount of oil will be wholly discharged from said space in the manner above described if the next stroke is also normal.

On the contrary, when the stroke is too short, cam 31 does not lift valve $32^1$ up to its highest position and a certain amount of oil, which is the more considerable as the stroke is more insufficient, remains stored up in the space between $32^1$ and 34. During the upward movement of slide valve $32^1$, piston 34 first follows the movement of said valve, which closes opening 43 and cuts off the communication with reservoir 14. When the groove 40 of piston 34 reaches the level of the upper opening of conduit 37, the oil present between members $32^1$ and 34 can flow into said conduit 37 through the axial conduit 41 of said piston 34, and the whole of said oil is expelled under the action of spring 35, which immediately applies piston 34 against its seat, while valve $32^1$ keeps moving in a downward manner, but at a slower rate. The oil thus discharged escapes through conduit 37, the groove 39 of slide valve $32^1$, and conduit 38, toward chamber 30, so as to displace piston which acts (either directly or indirectly) in the direction of the arrow marked by positive sign $+$ on the adjustment rod 10 of the fuel feed pump 11, so as to increase the feed of fuel injected into cylinder 1 at the next stroke.

In the case of too long a stroke, cam $31^2$ and distributing member $32^2$ act, for instance, for discharging oil from chamber 30, through check valve 44 and conduit 38, into reservoir 14. For this purpose member $32^2$, the normal upper point of which is located at the level of conduit 38 for normal strokes, stops this conduit 38 when the stroke is too long and discharges an amount of oil, proportional to its upward displacement, through check valve 44, into reservoir 14. When moving downwardly, member $32^2$ first produces a vacuum in its cylinder 45, owing to the provision of valve 44 and this vacuum is occupied by a corresponding amount of oil, coming from chamber 30, when member $32^2$ has moved below the level of conduit 38. It follows that piston 9, acted upon by a return spring, moves in a backward direction, driving rod 10 in the direction of the arrow marked with sign $-$.

In the embodiment of Figs. 9 to 13 inclusive, I employ a single distributing member 32, provided between chamber 30 and reservoir 14 and housed in a cylinder 33. Distributing member 32 is provided with a single circular groove 40, communicating, through axial passage 41 with cylinder 33. Between cylinder 33 and chamber 30, there are provided two communication conduits, one $38^1$ provided with an automatic check valve $46^1$ for the discharge and the other $38^2$ with an automatic check valve $46^2$ for suction. Between cylinder 33 and reservoir 14, there is established a conduit 36 having two openings 42 and 43 located at different levels, conduit 42 being normally closed by a valve 47 acted upon by a spring 48.

The distance $a$ (Figs. 9 and 10) between the openings 43 and $38^1$ measures the amount of oil which is, for each upward movement of distributing member 32, discharged into chamber 30 because, in view of the action of spring 48 on valve 47, said valve is moved from its seat only after slide valve 32 has closed conduit $38^1$. At this time, groove 40 uncovers the inlet of conduit $38^2$ and distributing member 32, when moving downwardly, draws from chamber 30, through conduits $38^2$, 41 and past valve $46^2$, an amount of oil proportional to the height $b$ which corresponds to the lift of distributing member 32 above conduit $38^1$. At the end of each downward stroke, said distributing member uncovers opening 43, thus feeding cylinder 33.

It will be understood that the amount of oil drawn in from chamber 30, depends upon value $b$. When $b$ is smaller than $a$ (Fig. 11), the amount of oil that is drawn in is lower than the constant amount discharged into chamber 30, which corresponds to too short a stroke of movable part $13^1$ and piston 9 acts upon the adjustment rod 10 of the feed pump as in the preceding examples. When $b$ is equal to $a$ (Fig. 12 and normal stroke), the amount of oil that is sucked in corresponds to the amount that is discharged and piston 9 remains stationary. On the contrary, if $b$ is greater than $a$ (Fig. 13 and too long a stroke) the piston 9 is displaced in the opposite direction and acts in consequence on the adjustment rod 10.

Instead of having recourse, for controlling the measuring relay, to the amplitude of the displacements of the movable parts of the machine, such as $13^1$, I may also, as shown in Fig. 14, bring into play the acceleration of said movable parts.

For this purpose, I fit on said movable part 13¹ a cylinder 49 in which is housed a free piston 50, urged toward its abutment 51 by a spring 52. This cylinder 49 contains a liquid and communicates, through at least one orifice 53, with a chamber 54 into which opens a tube 55 connected with chamber 30, in which is housed the piston 9 which controls the adjustment rod 10 of the feed pump, in the direction above stated.

Under the influence of the acceleration of movable part 13¹, a piston 50 is displaced and drives a portion of the liquid through orifice 53, chamber 54 and tube 55, into chamber 30, which lifts piston 9 with an amplitude which corresponds to the movement of piston 50. A stationary return tube 56 brings the liquid discharged by piston 9 into a chamber 57 which communicates through an orifice 58 with chamber 59, provided in cylinder 49 behind the free piston 50. This piston includes an axial passage provided with a check valve 60, in such manner that the liquid can flow back to cylinder 49. A calibrated and adjustable small conduit 61 makes it possible for the liquid that has acted on piston 9 to be slowly evacuated through the return tube 56. According as the acceleration of the movable part 13¹ is high or low, the amount of liquid acting on piston 9 is more or less important, in such manner that if the acceleration exceeds its normal value (for instance in the case of too strong an explosion) rod 10 is operated so as to reduce the amount of fuel that is injected. On the contrary, for too low an acceleration (for instance in the case of an insufficient explosion) piston moves with a stroke smaller than its normal stroke.

It should be well understood that the invention is in no way limited to the arrangements of measuring relays which have just been described, as other kinds of relays, of hydraulic, pneumatic, mechanical or electrical kinds, might be used according to the invention.

The devices above described permit of correcting the amplitudes of the strokes between two given limits. It may be useful, for a good supervising of the machine, to indicate the variations of stroke on a dial or the like and to provide means for automatically stopping the machine when the variation of stroke exceeds the limits of normal running.

Such a device is shown by way of example in Fig. 8. In this case, a needle 62, controlled by piston 9, indicates on a dial 63 the variations of stroke. The injection of fuel can be stopped, when these variations exceed the limit that have been fixed, by the pressure of a fluid, fed from a source not shown on the drawings, on a piston 64 which acts on a rocking lever 65 as soon as a slide valve 66, rigid with piston 9, allows said fluid to flow into conduit 67, which leads said fluid to piston 64.

Also according to the invention, the correction of the strokes by the quantitative adjustment of the fuel injection may be combined with the regulation of the power of the machine, generally obtained by the quantitative variation of the fuel injected.

For this purpose, and as shown by Figs. 4, 8 and 9, this automatic regulation is obtained by bringing into play the pressure existing in the reservoir 68 into which the compressors discharge their fluid under pressure. This pressure is transmitted through a conduit 69 to a piston 70 acting, through a cam 71, for instance an oscillating cam, and an equalizer bar 72, on the rod 10 which controls the quantitative adjustment of the feed pump 11. Advantageously, the device for correcting the strokes of the pistons is combined with the regulating device, for instance by causing the rod 73 of the correcting piston 9 of the dosing relay to act on the equalizer bar 72.

I may also, according to the invention, combine with the device for regulating the power and with the device for correcting the values of the strokes, the variation of the point of injection or ignition, by interposing, for instance, as shown by Fig. 9, between the control cam 13 and the push member of the injection pump 11, a lever 74 which bears upon the cam 13 and the other end of which is pivotally connected to an oscillating member 75, connected through a rod 76 with the regulating piston 70. It is thus possible to adapt the position of the point of injection to the value of the stroke, which depends upon the discharge pressure of the machine, the strokes being shorter when the pressure is higher.

Furthermore, according to the invention, the device for correcting the strokes may be adjusted to the various conditions of load of the machine, as well when the variations of load are obtained by varying the pressure as when they are obtained by varying the output, or again by varying simultaneously both of these factors.

For this purpose, I may, as shown by way of example in Fig. 9, interpose between cam 31 and the distributing piston 32 of the relay which is controlled by said cam an intermediate lever 78 pivotally connected to an oscillating member 77, which can be moved, both laterally and angularly. The lateral displacement is for instance produced by a rod 79 which may be coupled to the regulator of the receiving machine while the angular displacements of said lever 77 are obtained in consequence of the displacements of a rod 76 responsive to variations of the discharge pressure, for instance by operatively connecting said rod 76 to the piston 70 above referred to. Besides, rod 76 may advantageously, as shown in Fig. 9, simultaneously control the variation of the point of injection, as above explained.

Although the principle of the invention is especially applicable to machines of the kind in question which are associated in tandem arrangement, this principle may also be applied to simple machines of this type, and more especially to those which must work for a long time under the same conditions of load.

In these simple machines, the amount of fuel injected into the cylinder may be varied. In the embodiment of Fig. 15, this variation is obtained directly in accordance with the value of the stroke of movable member 13¹. In the embodiments of Figs. 16 and 17, the variation of the fuel feed is obtained in accordance with the pressure existing in auxiliary chambers, such for instance as the compensation reservoir or cushion 80, the pressures in these chambers depending upon the stroke of the movable parts of the machine, or in accordance with the acceleration of said movable parts, or in any other way.

As in the preceding examples illustrated by the drawings, the adjustment rod 10 of the feed pump 11 of the motor is acted upon by a control piston 9, upon the faces of which acts the pressure supplied by a relay pump 6—7, fed from a reservoir 14 and controlled for instance by a cam 12¹ rigid with the movable part 13¹. The output of the pump is controlled by a distributing valve 8, for instance a slide valve, the lift of which depends upon the stroke of the movable part 13¹, said upward movement of the valve being obtained through a cam $31^1$ operatively connected with said movable part $13^1$ (Fig. 15).

In the embodiment of Fig. 16, this upward movement of member 8 is obtained through the action of the maximum pressure existing in the compensation cushion 80.

In the embodiment of Fig. 17, the upward movement of member 8 is obtained through the action of the maximum pressure existing in an auxiliary chamber 81 in which moves a piston 82, rigid with the movable part $13^1$, the action of this pressure being transmitted directly to distributing valve 8 through a conduit 88.

In the case of Fig. 15, the upward movement of distributing valve 8 is the greater as the stroke of the movable part $13^1$ is longer. Besides, the operation of this device is analogous to that explained with reference to Fig. 1. The distributing valve 8 may be kept in position, during the non-motive stroke of the driving pistons 2, for instance by means of a pawl such as 83, urged by a spring 84 and released by the action of a finger 85 mounted on the movable part $13^1$, near the end of the non-motive stroke of said pistons 2.

In the case of Fig. 16, the distributing valve is lifted near the end of the motive stroke, by the pressure existing in the compression cushion 80 and this pressure keeps acting, owing to the check valve 86, during the non-motive stroke of piston 2 until said piston uncovers an orifice 87, near the end of said nonmotive stroke, which orifice opens into said compensation cushion 80. In this case also the working of the dosing relay is analogous to that above described with reference to Fig. 1.

Fig. 17 shows a modification of the preceding arrangement in which the auxiliary chamber 81, with its check valve 86, plays the same part of the compensating cushion 80.

Anyway, for given conditions of working, any variation of the stroke of the movable part, or of the maximum pressure existing in chamber 68, 80 or 81, automatically produces an inverse variation of the amount of fuel that is injected to the machine, in such manner as to stabilize the working conditions and therefore the output of the machine.

In this case also the correction of the amount of fuel injected into the machine may be adapted to the various conditions of loading of the machine and this for a hand control or for an automatic control.

In Fig. 15 I have shown, by way of example, a control from a distance 89 acting upon a sleeve 90 which, due to its sliding movement between distributing valve 8 and connecting conduits 26 and 27, makes it possible to advance or delay the distribution of fluid to the faces of piston 9, and therefore to adapt the correction to various conditions of loading. This control member 89 may be operated manually or it may be coupled with a governor, in which case it becomes automatic.

In the embodiments of Figs. 16 and 17, I have disclosed means for effecting an automatic correction in accordance with the pressure existing in the reservoir 68 of the machine. In this case, the compensating cushion (Fig. 16) or the auxiliary chamber 81 (Fig. 17) is connected, at the end of every inward stroke of the driving pistons 2, with reservoir 68 through a conduit 91, in such manner that the maximum pressure, in chamber 80 or 81, which is intended to act on distributing valve 8, varies with the load of the machine.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A motor compressor of the type described, having motor and compression cylinders, and pistons freely slidable in said cylinders, which comprises, in combination, means for feeding fuel to said motor cylinders, fuel feed adjusting means for varying the amount of fuel fed by said means at each stroke, and means, responsive to variations in the working strokes of said pistons, for controlling said adjusting means so as to regulate the working of the motor compressor.

2. A motor compressor of the type described which comprises, in combination, at least one cylinder, two driving pistons freely movable in said cylinder, fluid compressing means directly operative by said pistons, means for feeding fuel into said cylinder between said pistons, fuel feed adjusting means for varying the amount of fuel delivered by said fuel feed means at each stroke, and means responsive to variations of the stroke of said pistons for controlling said adjusting means.

3. A motor compressor of the type described which comprises, in combination, at least one cylinder, two driving pistons movable in said cylinder, fluid compressing means directly operative by said pistons, means for feeding fuel into said cylinder between said pistons, fuel feed adjusting means for varying the amount of fuel delivered by said fuel feed means at each stroke, a chamber, means for producing in said chamber a fluid pressure corresponding to the value of the stroke of said pistons, and means responsive to variations of said fluid pressure for controlling said fuel feed adjusting means.

4. A motor compressor of the type described which comprises, in combination, at least one cylinder, two driving pistons movable in said cylinder, fluid compressing means directly operative by said pistons, means for feeding fuel into said cylinder between said pistons, fuel feed adjusting means for varying the amount of fuel delivered by said fuel feed means at each stroke, a reservoir of liquid, a pump for said liquid fed from said reservoir and operative by said pistons, a cylinder, a piston movable in said cylinder, means operative by said last mentioned piston for controlling said fuel feed adjusting means, a passage connecting the discharge of said pump with the part of said last mentioned cylinder on one side of said last mentioned piston, a passage connecting the discharge of said pump with the part of said last mentioned cylinder on the other side of said last mentioned piston, a chamber connected to said compressing means, and a distributing valve operative by the fluid pressure in said chamber capable of stopping at least one of said passages.

5. A machine according to claim 4 including two motor cylinders, each with two driving pistons disposed in tandem relation, the chamber above mentioned consisting of the space between the driving pistons of one of said two driving cylinders, acting in combination with the fuel injecting means of the other motor cylinder.

6. A machine according to claim 4 in which said chamber consists of the compensating cushion associated with said first mentioned cylinder.

7. A machine according to claim 4 in which said chamber consists of a stationary cylinder including a piston operatively connected with one of said driving pistons.

8. A motor compressor of the type described which comprises, in combination, at least one cylinder, two driving pistons movable in said cylinder, fluid compressing means directly operative by said pistons, means for feeding fuel into said cylinder between said pistons, fuel feed adjusting means for varying the amount of fuel delivered by said fuel feed means at each stroke, a cylinder, a piston movable in said cylinder, means operative by said last mentioned piston for controlling said fuel feed adjusting means, a reservoir for a liquid, means responsive to decreases of the strokes of said pistons below the normal value of said stroke for discharging liquid from said reservoir into said last mentioned cylinder so as to move said last mentioned piston in the direction that corresponds to an increase of the fuel feed, and means responsive to increases of the strokes of said pistons above the normal value of said stroke for causing liquid to flow from said last mentioned cylinder into said reservoir so as to move said last mentioned piston in the opposite direction.

9. A motor compressor of the type described which comprises, in combination, at least one cylinder, two driving pistons movable in said cylinder, fluid compressing means directly operative by said pistons, means for feeding fuel into said cylinder between said pistons, fuel feed adjusting means for varying the amount of fuel delivered by said fuel feed means at each stroke, a cylinder, a piston movable in said cylinder, means operative by said last mentioned piston for controlling said fuel feed adjusting means, a reservoir for a liquid, a cylindrical sleeve, two slide valve elements movable in said sleeve, passages, extending through said sleeve and including a portion of the cylindrical bore thereof, connecting said reservoir with the part of the last mentioned cylinder located on one side of the last mentioned piston, said side being that on which an increase of pressure shall move said last mentioned piston in the direction that corresponds to an increase of the fuel feed, means operative by said first mentioned pistons for imparting to one of said slide valve elements a reciprocating movement of an amplitude proportional to the stroke of said first mentioned pistons, an abutment for the other side valve element limiting the displacements of said second mentioned slide valve element toward the other slide valve element, spring means for applying said second mentioned slide valve element against said abutment, said passages opening into said cylindrical bore of the sleeve at points such that a decrease of the stroke of the two first mentioned pistons below the normal value of said stroke causes liquid to be discharged from said reservoir into the second mentioned cylinder through said passage, and liquid pumping means, associated with said passage and operative by said driving pistons with a stroke proportional to the stroke of said driving pistons for drawing liquid from said part of the second mentioned cylinder into said reservoir when the strokes of said driving pistons increase above the normal value of said stroke.

10. A motor compressor of the type described which comprises, in combination, at least one cylinder, two driving pistons movable in said cylinder, fluid compressing means directly operative by said pistons, means for feeding fuel into said cylinder between said pistons, fuel feed adjusting means for varying the amount of fuel delivered by said fuel feed means at each stroke, a cylinder, a piston movable in said cylinder, means operative by said last mentioned piston for controlling said fuel feed adjusting means, a reservoir for a liquid, a cylindrical sleeve, a slide valve movable in said sleeve, two passages, extending through said sleeve and including a portion of the cylindrical bore therein, interconnecting said reservoir and the part of the last mentioned cylinder located on one side of the last mentioned piston, said side being that on which an increase of pressure shall move said last mentioned piston in the direction that corresponds to an increase of the fuel feed, valve means in said two passages arranged in such manner that one of said passages permits only the flow of liquid from the reservoir to the last mentioned cylinder and the other passage permits only the flow of liquid from said last mentioned cylinder to said reservoir, means operative by said driving pistons for imparting to said slide valve element a reciprocating movement of an amplitude proportional to the stroke of said driving pistons, said passages opening into the cylindrical bore of said sleeve at points such that each alternating movement of said slide valve corresponds to a discharge of a constant amount of liquid from said reservoir into said cylinder, and to the return, from said last mentioned cylinder into said reservoir, of a certain amount of liquid depending upon the stroke of the driving cylinders.

11. A motor compressor of the type described which comprises, in combination, at least one cylinder, two driving pistons movable in said cylinder, fluid compressing means directly operative by said pistons, means for feeding fuel into said cylinder between said pistons, fuel feed adjusting means for varying the amount of fuel delivered by said fuel feed means at each stroke, a reservoir of liquid, a pump for said liquid fed from said reservoir and operative by said pistons, a cylinder, a piston movable in said cylinder, means operative by said last mentioned piston for controlling said fuel feed adjusting means, a passage connecting the discharge of said pump with the part of said last mentioned cylinder located on one side of said last mentioned piston, a passage connecting the discharge of said pump with the part of said last mentioned cylinder located on the other side of said last mentioned piston, a distributing valve capable of stopping at least one of said passages, and means operative by said driving piston for fixing the position of said valve in accordance with the value of the stroke of said pistons.

12. A motor compressor of the type described which comprises, in combination, at least one cylinder, two driving pistons movable in said cylinder, fluid compressing means operative directly by said pistons, means for feeding fuel into said cylinder between said pistons, fuel feed adjusting means for varying the amount of fuel delivered by said fuel feed means at each stroke, and means responsive to variations of the acceleration of said driving pistons for controlling said adjusting means.

13. A motor compressor of the type described, which comprises, in combination, at least one cylinder, two driving pistons movable in said cylinder, fluid compressing means operative directly by said pistons, means for feeding fuel into said cylinder between said pistons, fuel feed adjusting means for varying the amount of fuel delivered by said fuel feed means at each stroke, a cylinder, a piston movable in said cylinder, means operative by said last mentioned piston for controlling said fuel feed adjusting means, a cylinder rigidly connected with one of said driving pistons, an abutment in said last mentioned cylinder, a piston movable freely in said last mentioned cylinder, spring means for applying said last mentioned piston against said abutment, and a system of passages and conduits connecting respectively corresponding sides of the two last mentioned cylinders with one another, whereby a variation in the acceleration of said last mentioned piston can produce a movement of the above mentioned piston in its cylinder.

14. A machine according to claim 2 further including means operatively connected with the last means of claim 2 for indicating the value of the stroke of said driving pistons.

15. A machine according to claim 2 further including means operatively connected with the last means of claim 2 for stopping the machine when the strokes of the driving pistons vary beyond certain limits.

16. A machine according to claim 2 further including means, responsive means responsive to variations of the load of the machine for influencing said fuel feed adjusting means.

17. A machine according to claim 2 further including a reservoir for the fluid under pressure fed by said fluid compressing means, and means operative by the fluid pressure in said reservoir for varying the action of said fuel feed adjusting means.

18. A machine according to claim 2 further including a reservoir for the fluid under pressure fed by said fluid compressing means, and means operative by the fluid pressure in said reservoir for varying the time of injection of fuel into said cylinder.

19. A machine according to claim 2 further including a reservoir for the fluid under pressure fed by said fluid compressing means, means operative by the fluid pressure in said reservoir for varying the action of said fuel feed adjusting means in accordance with said fluid pressure, and means operative by the fluid pressure in said reservoir for varying the time of injection of fuel into said cylinder in accordance with the value of said fluid pressure.

RAUL PATERAS PESCARA.